(12) United States Patent
Steinle et al.

(10) Patent No.: US 7,048,337 B2
(45) Date of Patent: May 23, 2006

(54) RETRACTABLE HEADREST

(75) Inventors: Jürgen Steinle, Augsburg (DE); James T. Davis, II, Thousand Oaks, CA (US); Scott P. McManigal, Pacific Palisades, CA (US); Felix Nagelin, Malibu, CA (US); John W. Krieger, Oxnard, CA (US); David J. Shumate, Los Angeles, CA (US); Randall C. Lewis, Simi Valley, CA (US)

(73) Assignee: Designworks/USA, Inc., Newbury Park, CA (US)

( * ) Notice: Subject to any disclaimer, the term of this patent is extended or adjusted under 35 U.S.C. 154(b) by 0 days.

(21) Appl. No.: 10/366,723

(22) Filed: Feb. 14, 2003

(65) Prior Publication Data

US 2004/0160107 A1    Aug. 19, 2004

(51) Int. Cl.
    *B60R 22/28* (2006.01)
(52) U.S. Cl. .................................. 297/409
(58) Field of Classification Search ............. 297/408, 297/409, 410, 396, 61, 391
    See application file for complete search history.

(56) References Cited

U.S. PATENT DOCUMENTS

| | | | |
|---|---|---|---|
| 2,652,101 A * | 9/1953 | Samsky et al. ............. 297/114 |
| 3,586,366 A | 6/1971 | Patrick |
| 4,113,310 A * | 9/1978 | Kapanka ..................... 297/408 |
| 4,123,104 A | 10/1978 | Andres et al. |
| 4,350,389 A * | 9/1982 | Parsson et al. ............. 297/410 |
| 4,511,180 A | 4/1985 | Klaus |
| 4,596,403 A | 6/1986 | Dieckmann et al. |
| 4,623,166 A | 11/1986 | Andres et al. |
| 4,693,515 A * | 9/1987 | Russo et al. ................. 297/391 |
| 4,711,494 A * | 12/1987 | Duvenkamp ................. 297/403 |
| 4,834,456 A | 5/1989 | Barros et al. |
| 4,865,388 A | 9/1989 | Nemoto |
| 5,056,816 A | 10/1991 | Lutze et al. |
| 5,464,269 A * | 11/1995 | Mizelle ........................ 297/61 |
| 6,447,068 B1 | 9/2002 | Anderson et al. |

FOREIGN PATENT DOCUMENTS

| | | |
|---|---|---|
| DE | 4227697 | 2/1994 |
| DE | 4333123 | 11/1994 |
| DE | 19722785 | 12/1998 |
| DE | 19959900 | 6/2001 |
| EP | 0895895 | 2/1999 |
| GB | 1378581 | 12/1974 |

* cited by examiner

Primary Examiner—Milton Nelson, Jr.
(74) Attorney, Agent, or Firm—Davidson Berquist Jackson & Gowdey LLP

(57) ABSTRACT

A retractable headrest is movable between an extended position for protecting a passenger and a retracted position for improving rearward visibility. In a first embodiment, the headrest is positioned below a stretchable fabric panel which allows a headrest shell to be raised into the extended position by stretching the panel. A second embodiment incorporates an extending cushion that can be moved between the extended and retracted positions by an extending arm. A third embodiment incorporates a support frame that can be folded or bowed by a drive mechanism to move between the retracted and extended positions. A fourth embodiment is a hybrid between the second and third embodiments.

14 Claims, 10 Drawing Sheets

RETRACTABLE HEADREST

BACKGROUND OF THE INVENTION

The present invention relates to a headrest for a seat, and more particularly, to a retractable headrest for a rear automotive seat.

As is well known, automotive headrests (also known as head restraints) are extremely valuable in protecting passengers from injury in a collision, or even a sudden stop, by limiting the rearward travel of the passenger's head with respect to the passenger's neck and torso. Therefore, the vast majority of automobiles sold today have headrests installed on both the front and the rear seats for passenger protection. Headrests installed on the front seats are positioned directly behind the driver's and front passenger's heads and do not significantly impair the rearward vision of the driver, either by the driver's use of the rearview mirror or by the driver turning his or her head. When rear passengers are present, they can impair the rearward vision of the driver. However, since the rear seat headrests are positioned behind the rear passengers, the rear seat headrests generally do not significantly add to the rearward vision impairment when rear passengers are present.

On the other hand, when rear passengers are not present, fixed upright rear seat headrests continue to impair the driver's rearward vision. Therefore, it is desirable to provide rear seat headrests in an automobile that can be moved out of the driver's rearward view when rear passengers are not present, but which can be moved into a protecting position when rear passengers are present. There have been prior attempts to address this problem. For instance, in U.S. Pat. No. 3,586,366 to Patrick, a headrest pad is maintained at an adjusted height in a low-profile prone position until inertia from a collision or sudden stop pivots an upper portion of the pad into an upright position for protecting the passenger. The Patrick design can never be completely retracted out of the driver's view.

Others have proposed headrests, generally for the rear seats, where the headrest lies in a retracted position in an indented or sunken portion of the rear deck when not needed, but which can be pivoted out of the sunken portion into an upright position to protect a passenger. See, for example, U.S. Pat. No. 4,511,180 to Klaus, U.S. Pat. No. 4,596,403 to Dieckmann, U.S. Pat. No. 4,623,166 to Andres and U.S. Pat. No. 4,834,456 to Barros. While these headrest designs do retract out of the driver's vision when not in use, they are not particularly attractive or aesthetic in the retracted position and do not provide an integrated or hidden appearance in the retracted position. Similarly, other headrest designs are known which rotate from the ceiling or from the side into an extended position and can be at least partially retracted when not in use. These designs cannot fully retract out of the driver's rear vision.

Another proposal has been for a fixed construction combination headrest/roll bar that is maintained in a generally upright orientation but which can be retracted into a stowage cavity positioned behind the seat when not in use and extended upward out of the stowage cavity by a drive mechanism such as a motor driven rack and pinion when passenger protection is required. See U.S. Pat. No. 5,056, 816 to Lutze. This headrest/roll bar is quite large and relatively complex. Still others have proposed use of inflatable headrests that are maintained in a low-profile deflated position when not required but which can be inflated into an upright position when passenger protection is required. See U.S. Pat. No. 4,123,104 to Andres and U.S. Pat. No. 4,865, 388 to Nemoto. Neither of these designs truly provides an aesthetic hidden appearance in the retracted position.

Generally, these designs move into the extended position either upon the occurrence of an impact to the vehicle or by requiring a vehicle passenger to perform some manual operation to either manually move the headrest into position or to trigger a drive system to move the headrest into position.

A retractable headrest is desired that overcomes the shortcomings of the prior art.

SUMMARY OF THE INVENTION

The present invention is a retractable headrest that is extendable to protect a passenger and retractable to improve rearward visibility for the driver. The headrest is incorporated into the surrounding panels and upholstery to provide a clean attractive appearance, complementary to the surrounding decor, when in the retracted position.

In a first embodiment, the retractable headrest includes a stretchable fabric panel attached to one of a top portion of a seat and a parcel shelf; a headrest shell positioned below the stretchable fabric panel; and an operating mechanism attached to the headrest shell constructed and arranged to raise and lower the headrest shell between a retracted position and an extended position. The headrest shell is constructed and arranged to contact the stretchable fabric panel as it is raised such that the stretchable fabric panel is formed into a shape of the headrest shell when the headrest shell is in the extended position to act as a passenger headrest. The stretchable fabric panel is constructed and arranged to return to its original shape when the headrest shell is moved to the retracted position.

In a second embodiment, the retractable headrest includes a flexible extending cushion having a proximal portion attached to a seat and a free distal portion; the free portion of the extending cushion being movable between a lower retracted position and a higher extended position; and an extending arm that includes an adjustable height portion that can be raised and lowered. The free portion of the extending cushion is positioned over and engages an upper portion of the extending arm such that raising the adjustable height portion of the extending arm raises the free portion of the extending cushion and lowering the extending arm allows the extending cushion to lower with the extending cushion providing a passenger headrest in the extended position.

In a third embodiment, the retractable headrest includes a headrest frame assembly, the frame assembly including a forward portion pivotally mounted about a fixed pivot and a cushioned portion, the first headrest frame pivotally movable from a lowered retracted position to a raised extended position; a channel positioned on a parcel shelf of the vehicle, the channel shaped complementary to the headrest frame assembly to receive the headrest frame assembly in a complementary manner when the headrest frame assembly is in the retracted position; and an operating mechanism attached to the headrest frame assembly for raising and lowering the headrest frame assembly.

A fourth embodiment is a hybrid between the second and third embodiments where a flexible extending cushion is raised and lowered by a pivotally mounted forward portion of a frame assembly.

It is a specific object of the present invention to provide a retractable headrest that can be retracted when not in use so as not to impair the driver's vision.

It is a further object of the present invention to provide a retractable headrest that has an aesthetic appearance integrated into the surrounding panels and upholstery when in both the extended position and the retracted position.

It is a further object of the present invention to provide a retractable headrest that in the retracted position has an appearance integrated into the seat, parcel shelf, surrounding panels and/or upholstery so as not to appear as a headrest.

It is a further object of the present invention to provide a retractable headrest that is maintained in the retracted position until it is sensed that a passenger has occupied the seat corresponding to that headrest, whereupon the headrest is automatically extended to protect the passenger.

It is a further object of the present invention to provide a retractable headrest that automatically retracts when it is sensed that a passenger has exited from the seat corresponding to that headrest.

It is a further object of the present invention to provide a retractable headrest that is simple in construction.

These and further objects of the present invention will become apparent from the description herein read in conjunction with the accompanying drawings.

DETAILED DESCRIPTION OF THE INVENTION

Figure 1:
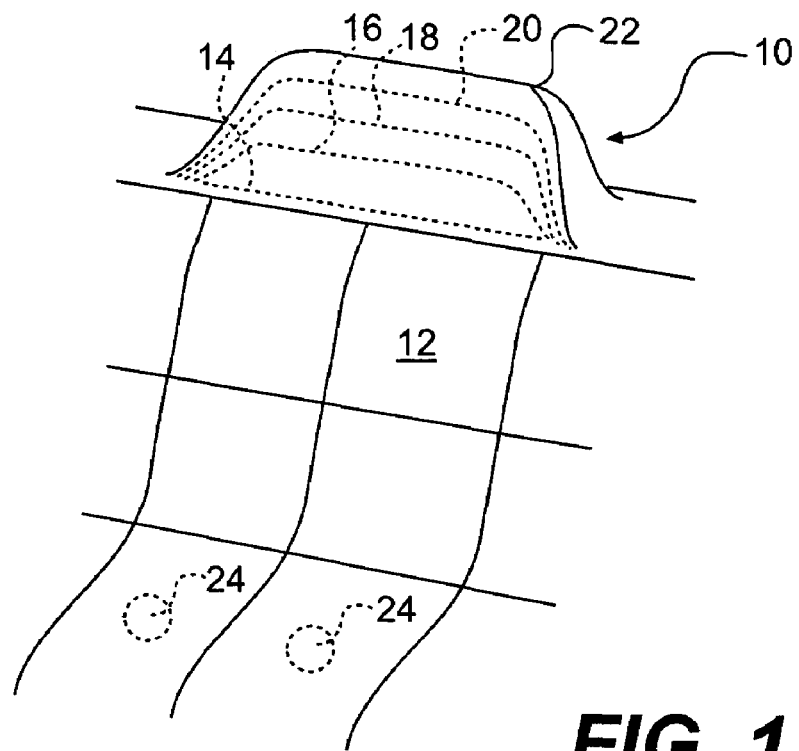
FIG. 1 is a partial perspective view of an automobile seat incorporating an embodiment of the present invention headrest, showing the headrest in an extended position.
Figure 2:
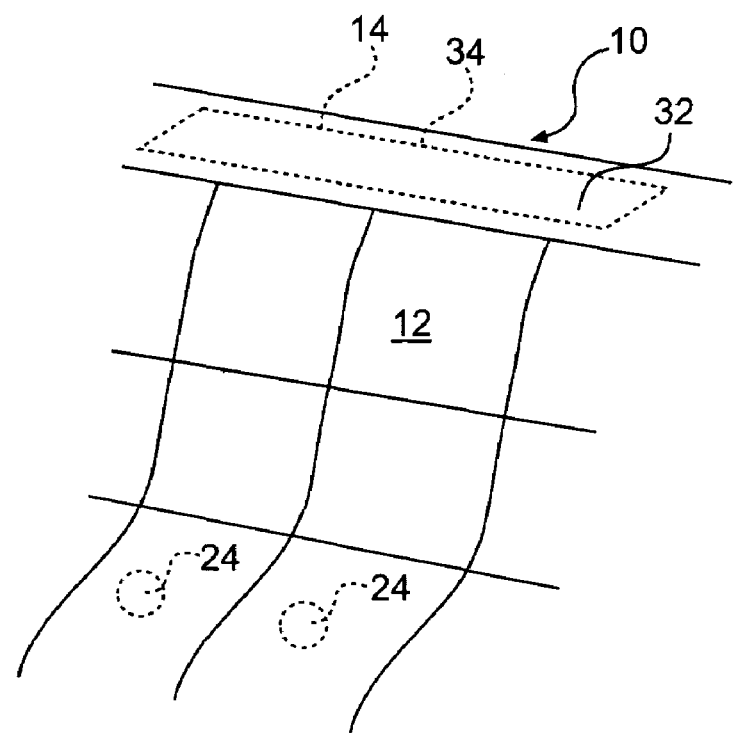
FIG. 2 is a partial perspective view as in FIG. 1, showing the headrest in a retracted position.
Figure 3:
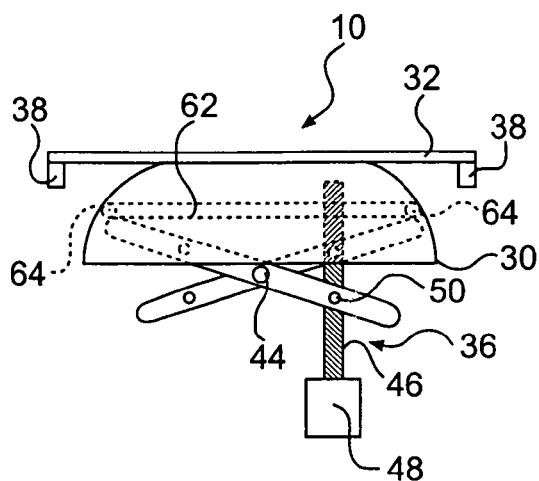
FIG. 3 is a partial front elevational view of the headrest of FIG. 1 and one embodiment of an operating mechanism in the retracted position.
Figure 4:
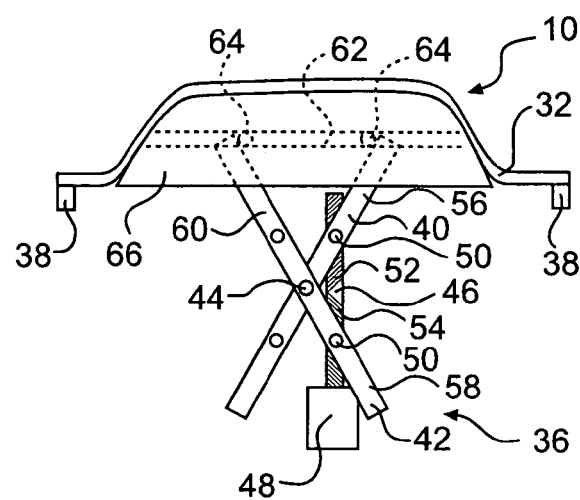
FIG. 4 is the same view as in FIG. 3 showing the headrest in an extended position.

FIGS. 1–4 show a first embodiment of the headrest 10 of the present invention mounted on a seat 12. FIGS. 1 and 4 show the headrest 10 in a fully extended position 22 and FIGS. 2 and 3 show the headrest 10 in a fully retracted position 14. A headrest shell 30 (see FIGS. 3–5) is positioned beneath a stretchable fabric cover 32 mounted on the seat 12. When an operating mechanism 36 is actuated to extend the headrest 10, the shell 30 moves upward into contact with the stretchable fabric cover 32, which conforms to the outer shape of the shell 30. FIG. 1 shows intermediate positions of the headrest 10 as it is extended from the fully retracted position 14 to the fully extended position 22 in phantom as positions 16, 18 and 20. The stretchable fabric cover 32 can be incorporated into the seat upholstery as a separate panel 34 attached to the top of the seat 12. The fabric panel 34 may be attached to the surrounding upholstery in conventional manners or can be attached to a separate supporting frame 38 that can be attached to the seat 12. Although the headrest 10 is shown as being attached to seat 12, it is contemplated that the headrest 10 can be incorporated in the parcel shelf, as other embodiments herein are shown, and vice-versa.

A first embodiment of operating mechanism 36 shown in FIGS. 3 and 4 incorporates a scissors type mechanism. Two arms 40 and 42 (preferably interchangeable) are rotatably mounted on a fixed pivot 44. A drive screw 46 driven by a motor 48 is mounted between extending portions 56 and 58 of arms 40 and 42, respectively, with two threaded collars 50 pivotally mounted on the respective arms 40 and 42 in known manner. The drive screw 46 has two separate portions 52 and 54 threaded with opposite handed threads, with the first portion 52 connected to portion 56 of arm 40 and the second portion 54 connected to portion 58 of arm 42. In this manner, depending on which way the drive screw is rotated, the portions 56 and 58 of the arms 40 and 42 will either be brought toward one another or driven away from one another when the motor 48 is actuated.

Arm portions 56 and 60 of arms 40 and 42 are attached to slide connectors 64 which are mounted in channels 62 of the shell 30 to provide a sliding attachment between the shell 30 and the arm portions 56 and 60. In this manner, as arm portions 56 and 58 are driven apart, arm portions 56 and 60 are driven toward one another, with the slide connectors 64 sliding in the channels 62, and upward, thereby extending the shell 30 upward. Reversing the motor reverses the process and retracts the headrest 10. As the shell 30 moves upward, it engages the stretchable fabric cover 32 and stretches it upward with the elasticity of the stretchable fabric cover 32 allowing it to conform to the shape of the shell 30.

In a preferred embodiment, the shell 30, which can be made of metal, plastic or other materials, will include an outer layer of foam to provide a cushioning effect between the cover 32 and the shell 30. Alternatively, the foam can be attached to an underside of the fabric cover 32. The shell 30 is given a shape such that it engages the fabric cover 32 from a center portion first and then progressively outward to best utilize the elasticity of the fabric cover 32. Since the shell 30 will determine the shape of the extended headrest, it is also given an aesthetic shape that complements the seat and automobile interior. An intermediate layer 66 having a low coefficient of friction can be attached to the shell 30 or the cover 32 between the respective components to prevent sticking between the two components as the shell 30 is extended or retracted.

One or more sensors 24 are preferably positioned in the seat 12 to sense when the seat is occupied. In a preferred embodiment, control of the headrest 10 is automatic such that when the ignition is on and the sensors 24 sense and signal that the seat is occupied, the operating mechanism 36 is actuated to extend the headrest 10. If it is sensed that the seat is not occupied, the headrest 10 is maintained in the retracted position to improve rear visibility of the driver.

Figure 5:
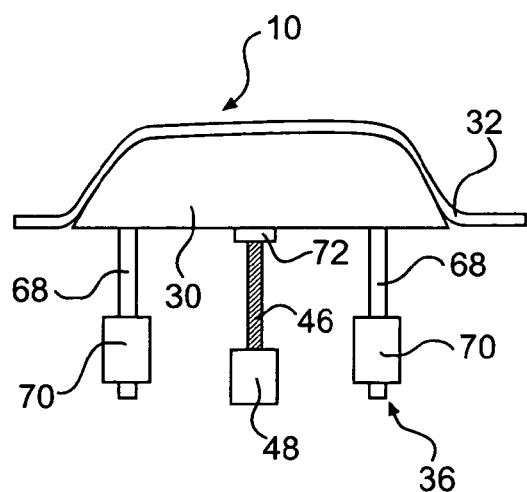
FIG. 5 is the same view as in FIG. 4 showing an alternative embodiment operating mechanism in an extended position.

An alternative embodiment of the drive mechanism 36 is shown in FIG. 5. Here, the shell 30 is mounted to a pair of shafts 68 which are slideably mounted in fixed bushings 70 in a generally upright orientation. The shafts 68 and bushings 70 allow the shell 30 to move up and down but retrain other unwanted movement. Drive screw 46 (here, threaded uniformly throughout) engages a threaded collar 72 on the shell 30 to drive the shell upward or downward when the motor 48 connected to the drive screw 46 is actuated. Alternatively, the shafts 68 and bushings 70 can be replaced with a pair of fixed motors 48 and drive screws 46, preferably actuated in a synchronized manner. Other drive mechanisms can be used in this embodiment, as well as with the other embodiments herein.

Figure 6:
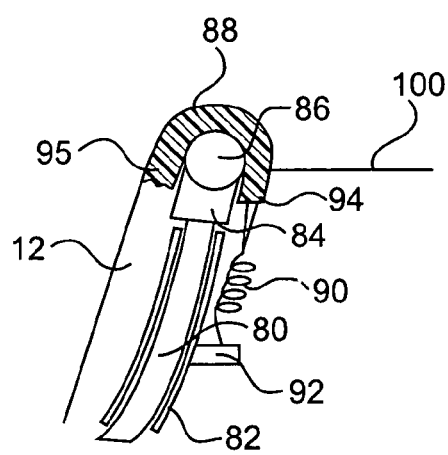
FIG. 6 is a side elevational view, partially sectioned, showing an alternative embodiment of the headrest of the present invention in a retracted position.
Figure 7:
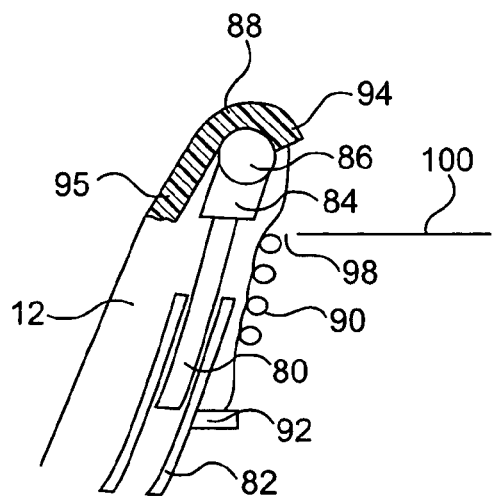
FIG. 7 is the same view as in FIG. 6 of the headrest in an extended position.

An alternative embodiment of the present invention is shown in FIGS. 6 and 7. In this embodiment, an extending arm 80 is slideably mounted in a fixed channel 82 mounted in or behind the seat 12. The engagement between the extending arm 80 and the channel 82 allows upward and downward motion of the extending arm 80 but prohibits other unwanted motion. The extending arm can be driven upward and downward by a drive screw, as in FIG. 5, by a rack and pinion mechanism or by other known mechanisms. The extending arm and channel can be straight, or as shown, have a complementary arcuate configuration so that the extending arm moves upward and downward along an arcuate path that also provides a more forward positioning of the headrest with respect to the seat when the extending arm 80 is extended.

A roller mechanism 84 is mounted at the top of the extending arm 80 and preferably includes a roller 86 rotatably mounted thereon. A proximate portion 95 of an elongated extending cushion 88 is attached to the seat 12 with an underside of the extending cushion 88 engaging and winding around an outer surface of the roller 86. As the extending arm 80 is driven upward, the extending cushion 88 unwinds from around the roller 86 to form the headrest 10. The rotation of the roller 86 eases friction and movement between the extending cushion 88 and the roller mechanism 84. The rotatable roller can be omitted in embodiments where friction between the extending cushion 88 and the roller mechanism 84 is otherwise low. The extending cushion can be maintained in contact with the roller mechanism 84 by a spring mechanism 90 attached between a fixed mount 92 and a distal portion 94 of the extending portion 88. The spring mechanism 90 provides a retracting force to the extending cushion 88.

Figure 13:
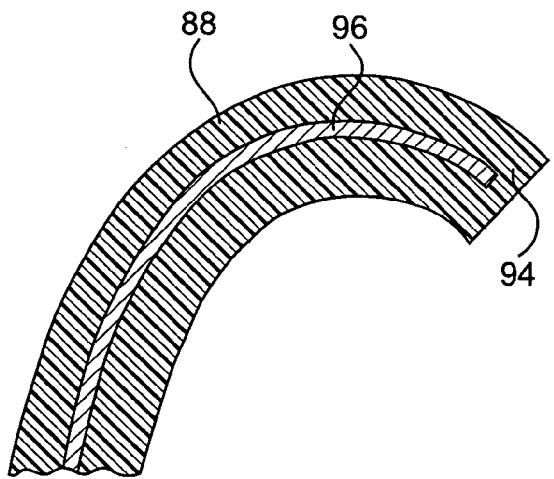
FIG. 13 is a side sectional view of a headrest pad of the present invention.

The extending cushion 88 can be provided with a spring member 96 (see FIG. 13), preferably internal and made of metal with a plate-like configuration, which is curved to maintain the extending cushion 88 in contact with the roller mechanism 84. The spring member 96 provides additional support to the front of the extending cushion 88 where the passenger's head would contact and can allow the spring mechanism 90 to be optionally omitted. The spring member 96 can also be wire form, whereupon a plurality of spring members 96 can be used in each extending cushion 88. In a retracted position, the distal end 94 of the extending cushion 88 preferably is positioned in a slot 98 between the roller mechanism 84 and a parcel shelf 100 for improved appearance. See FIG. 6. In alternative embodiments, the distal end 94 of the extending cushion 88 can be configured to rest in a complementary shaped channel in the parcel shelf 100 when in the retracted state.

Where the specific dimensions and configuration allow, the distal end 94 of the extending cushion 88 can be attached at a specific point to the roller 86 and the roller 86 can be spring loaded or motor driven. In this embodiment, the extending cushion 88 is firmly attached to the roller 86 for support and control and the spring loading/motor driving assists in the winding and unwinding of the extending cushion 88 on the roller 86 in operation. Such an embodiment can optionally omit the spring mechanism 90 and/or the internal spring member 96.

Figure 8:
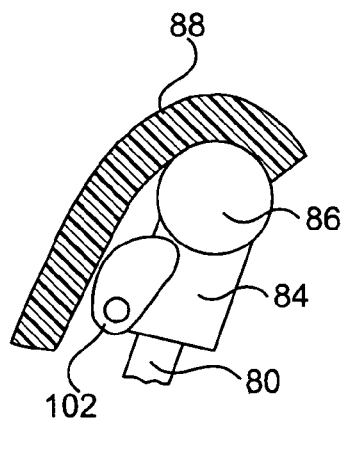
FIG. 8 is a partial sectional view of a modification of the embodiment of FIG. 6 with a support cam in a retracted position.
Figure 9:
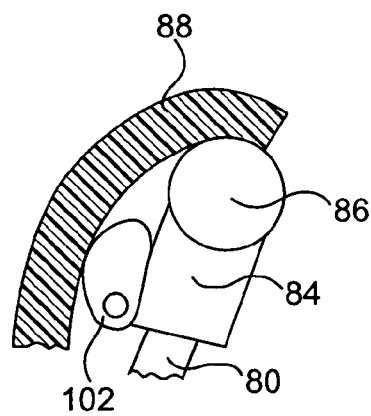
FIG. 9 is the same view as in FIG. 8 with the support cam in an extended position.

FIGS. 8 and 9 show a modification of the embodiment of FIGS. 6 and 7, where the roller mechanism 84 is provided with a front mounted cam mechanism 102 that can be operated to alter the shape of the extending cushion 88 in the extended position. By rotating the cam mechanism forward into contact with the extending cushion 88, the extending cushion 88 can be pushed forward as desired for support or comfort. The cam mechanism 102 is preferably motor driven in a known manner so that the passenger can adjust it conveniently. Alternatively, the cam mechanism 102 can be automatically controlled to push the extending cushion 88 forward a desired amount when the headrest 10 is extended and to retract when the headrest is retracted. While shown as having a fixed height with respect to the roller mechanism 84, in an alternative embodiment, the cam mechanism 102 can be mounted on an adjustable height mechanism to give further adjustability to shaping the extending cushion 88. See, for instance FIG. 12, described in more detail below.

Figure 10:
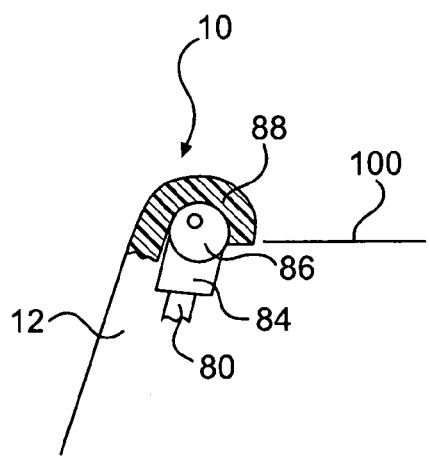
FIG. 10 is a side elevational view, partially sectioned, showing an alternative embodiment of the headrest of the present invention in a retracted position.
Figure 11:
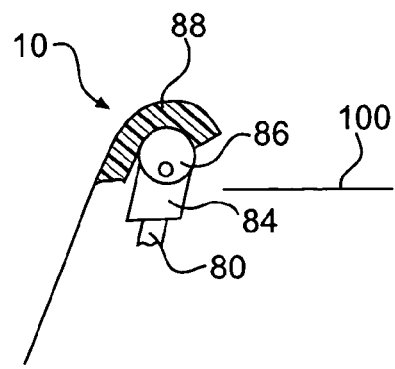
FIG. 11 is the same view as in FIG. 10 of the headrest in an extended position.

FIGS. 10 and 11 show an alternative embodiment where the roller 86 is rotatably mounted in an offset manner so as to act as a cam when rotated. Thus, in the retracted position of the headrest 10 the roller 86 is in a down-rotated position. If the roller 86 is rotated counterclockwise, by a known drive mechanism, it pushes the extending cushion 88 upward into the extended position. This embodiment can be used without an extending arm 80 and extending arm drive mechanism or can be used in conjunction with those components. Especially in the latter situation, the roller 86 can be rotated sufficiently counterclockwise that it starts to push the extending cushion 88 forward in the same manner as cam mechanism 102.

Figure 14:
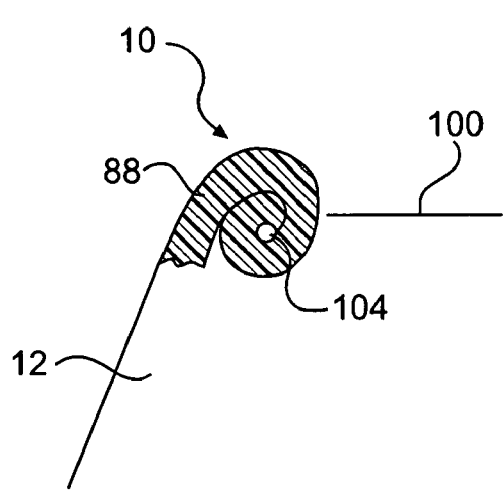
FIG. 14 is a side elevational view, partially sectioned and omitting the operating mechanism for clarity of view, showing an alternative embodiment of the headrest of the present invention in a retracted position.
Figure 15:
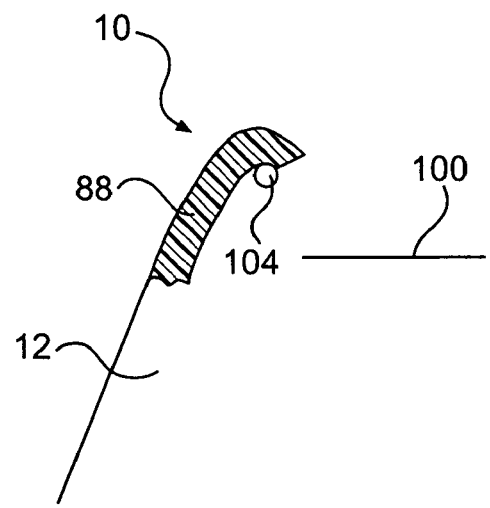
FIG. 15 is the same view as in FIG. 14 of the headrest in an extended position.
Figure 16:
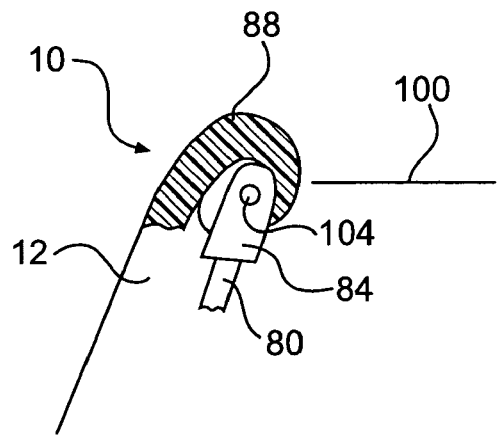
FIG. 16 is the same view as in FIG. 14 and including the operating mechanism.

In an alternative embodiment shown in FIGS. 14–16, the extending cushion 88 is maintained in a spiral configuration by a spirally configured spring member 96 when in the retracted position (FIGS. 14 and 16) with the distal end 94 of the extending cushion 88 connected to a roller shaft 104. The roller shaft 104 is rotatably mounted on the roller mechanism 84 (omitted from FIGS. 14 and 15 for clarity). As the extending arm 80 is driven upward from the retracted position (FIG. 14), the spirally wound extending cushion 88 unwinds from itself to form the headrest 10 in the extended position (FIG. 15).

Figure 12:
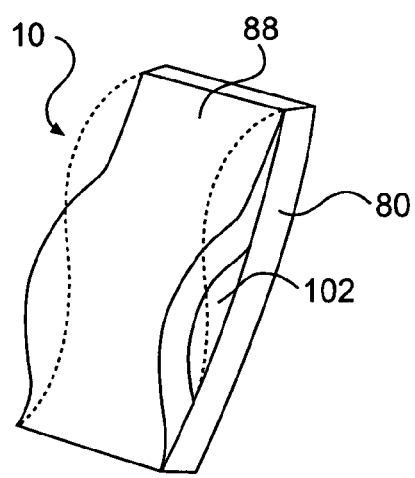
FIG. 12 is a front perspective view of an alternative embodiment of the present invention headrest in an extended position.

FIG. 12 shows an alterative embodiment of the present invention headrest. Here, the extending arm 80 itself can engage and extend the extending cushion 88. The extending arm 80 includes a cam mechanism 102 as described above. However, in this embodiment, the cam mechanism 102 is adjustable as to height by use of a known operating mechanism to allow adjustability of the front surface of the headrest 10. Compare the shape of the headrest shown with the shape shown in phantom.

Figure 17:
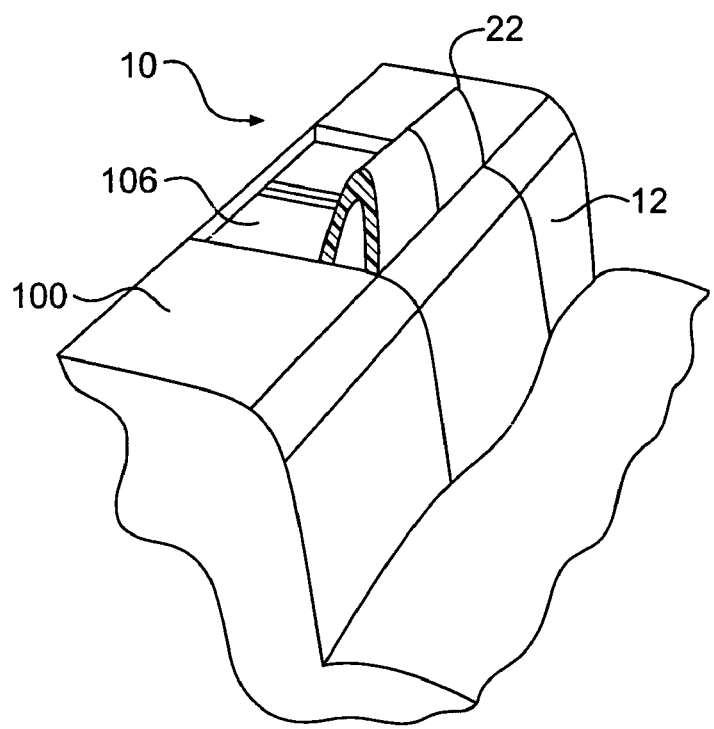
FIG. 17 is a partial perspective view of an automobile parcel shelf incorporating an alternative embodiment of the present invention headrest, showing the headrest in an extended position.
Figure 18:
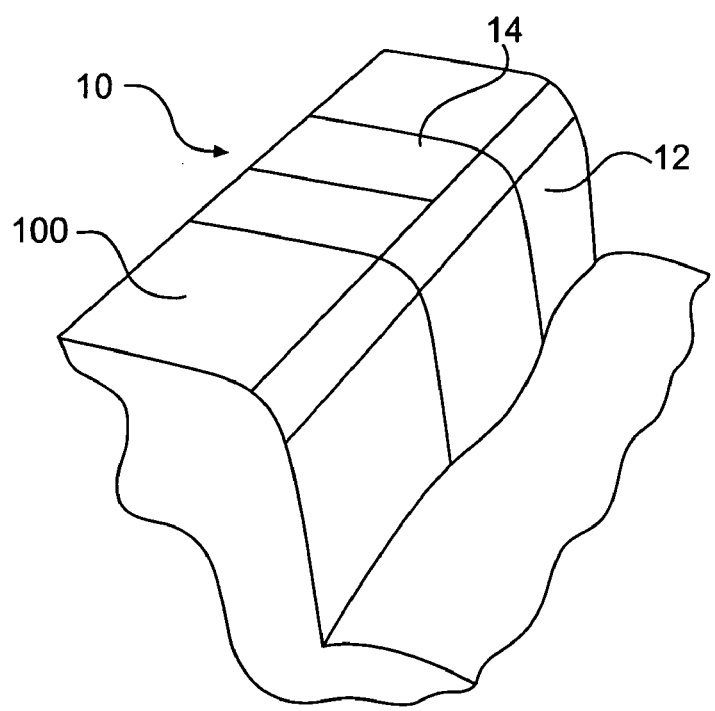
FIG. 18 is a partial perspective view as in FIG. 1, showing the headrest in a retracted position.
Figure 19:
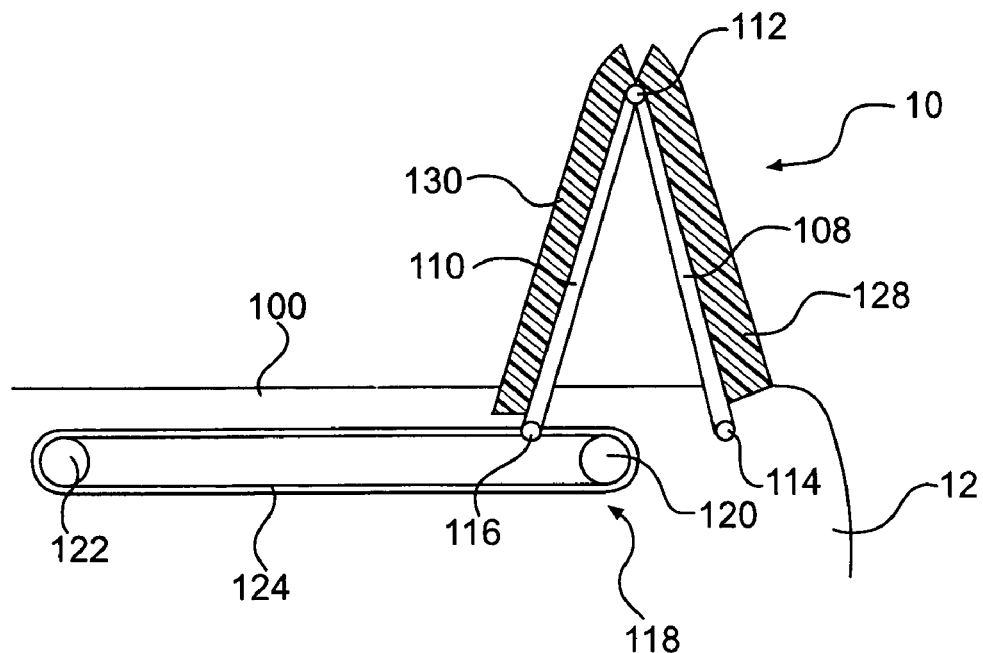
FIG. 19 is a partial side sectional view of the headrest of FIG. 17.

FIGS. 17–19 show an alternative embodiment of the present invention headrest 10 with FIG. 17 showing the headrest 10 in an extended position and FIG. 18 showing the headrest 10 in a retracted position. In this embodiment, the headrest is configured to retract into the parcel shelf 100. As can be seen in FIG. 17, the parcel shelf includes a channel 106 shaped to receive the headrest in a complementary and form fitting manner so that in the retracted position, the headrest appears to be a portion of the parcel shelf and the functionality of the headrest 10 is hidden. See FIG. 18.

FIG. 19 shows details of the operation of the headrest 10 which has a folding configuration. The headrest 10 includes a front support frame 108 and a rear support frame 110 pivotally connected together about hinge 112. A bottom portion of front support frame 108 is pivotally connected to a fixed pivot 114 and a bottom portion of rear support frame 110 is pivotally connected to a movable pivot 116. The movable pivot 116 is connected to a belt (or chain) drive mechanism 118. The belt drive mechanism 118 includes a driving motor 120, an idler pulley 122 and a belt 124 connected therebetween. As the drive motor is actuated to extend the headrest, it moves forward (to the right in FIG. 19) the upper portion of the belt 124 and the movable pivot 116 which is connected thereto. This forces the center portions of frames 108 and 110 to raise, pivoting about hinge 112, and causes frame 108 to pivot forward about pivot 114. Reversing the drive motor 120 will move the upper portion of the belt 124 rearward (to the left) thereby reversing the process and lowering the headrest 10. The support frames 108 and 110 are covered with upholstered pads 128 and 130 that complement the upholstery of the parcel shelf 100.

Figure 20:
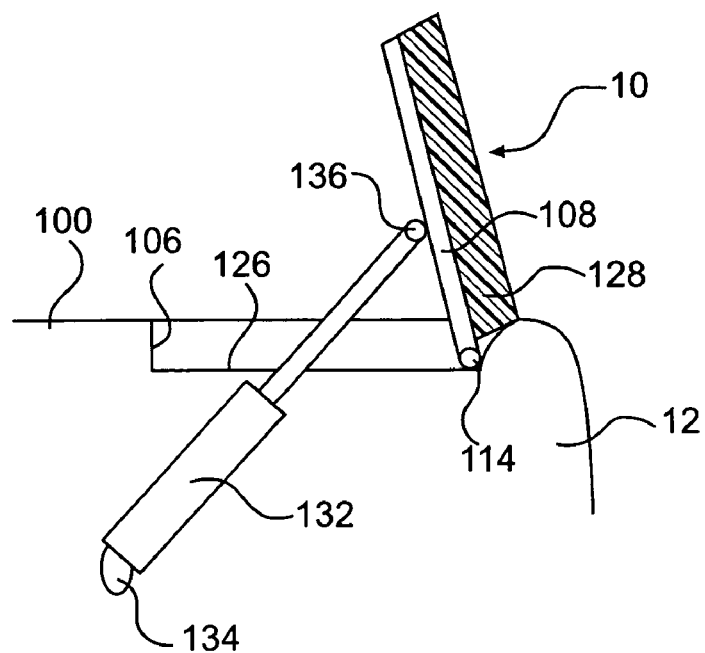
FIG. 20 is a partial side sectional view of an alternative embodiment of the headrest of the present invention.

FIG. 20 shows a modification of the previous embodiment where the rear support frame and belt drive are replaced by a linear travel pneumatic, hydraulic or threaded drive actuator 132 connected between a fixed pivot 134 and a pivot 136 attached to the front support frame 108. The headrest is extended by extending the actuator 132 and the headrest is retracted by retracting the actuator 132. A bottom portion of the actuator 132 is positioned below the channel 106 and passes through an opening 126 in the channel 106.

Figure 21:
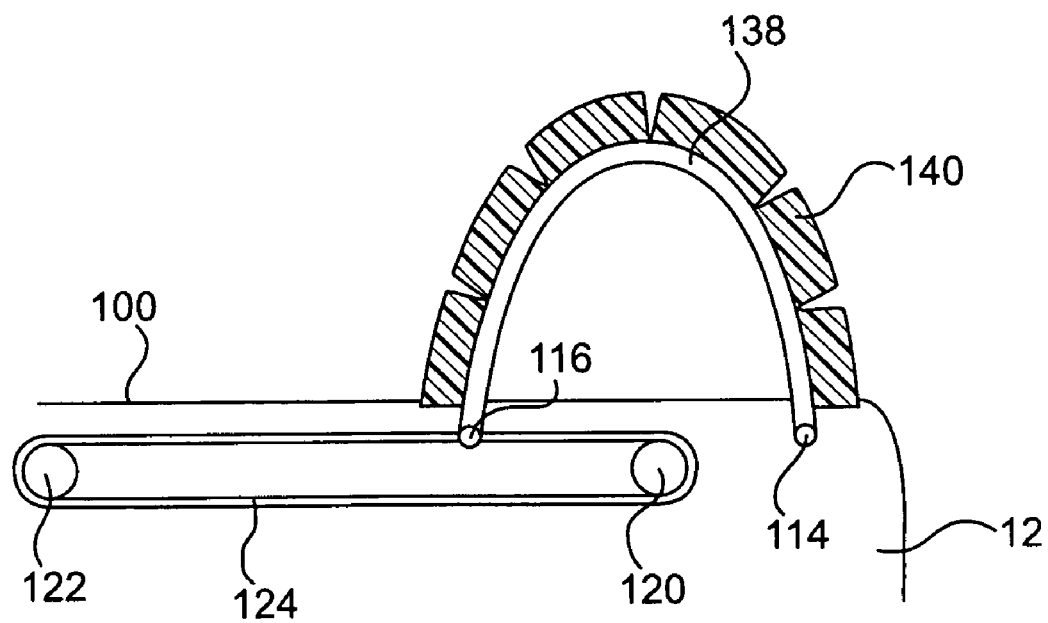
FIG. 21 is a partial side sectional view of an alternative embodiment of the headrest of the present invention.

In a further embodiment shown in FIG. 21, the support frames 108 and 110 and hinge 112 are replaced by a flexible spring member 138. The spring member is covered by a pad 140, shown as being segmented. In the retracted position, the spring member 138 is generally flat. As the motor 120 is actuated to move the upper belt portion forward and extend the headrest, the pivot 116 is brought closer to the pivot 114, forcing the spring member 138 to bow upward until a forward portion of the spring member 138 and pad 140 forms the forward facing portion of the headrest 10.

Figure 22:
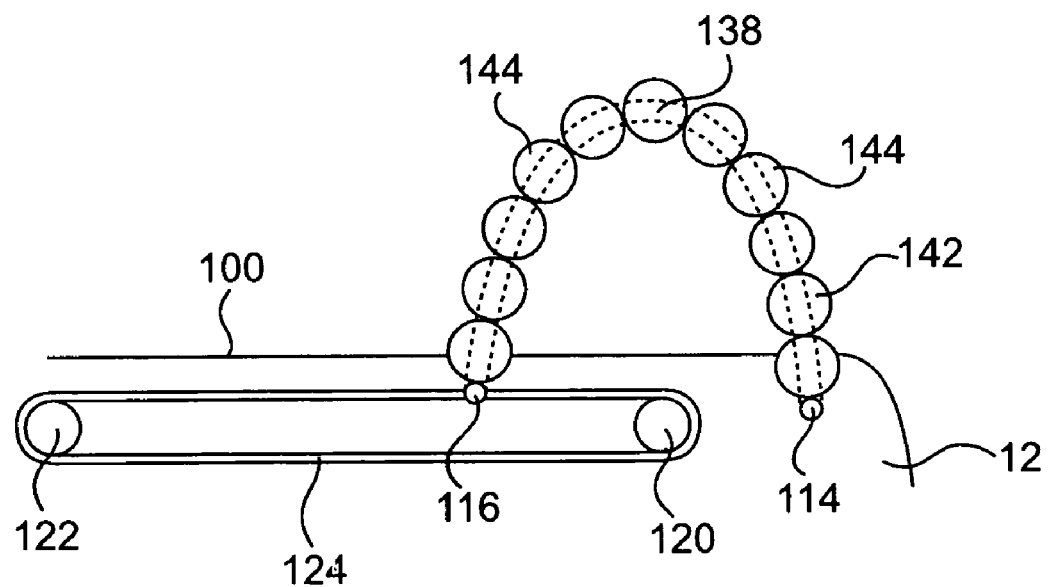
FIG. 22 is a partial side sectional view of an alternative embodiment of the headrest of the present invention.

The embodiment shown in FIG. 22 is similar but the pad 142 takes the form of a plurality of generally cylindrical cushion portions 144 and the spring member 138 passes through the cylindrical portions 144. These cylindrical cushion portions 144 can be molded onto the spring member 138 or installed over the spring member 138. The cylindrical cushion portions 144 can be separate or can be formed as a single unit. The cylindrical cushion portions 144 minimize stresses on the pad and upholstery as the spring member 138 is flexed from the flat state to the bowed state. In these two embodiments, a forward portion of the spring member 138 can actually be forced to bow forward by enough forward movement of the pivot 116 to reduce the space between the headrest and the passenger's head. The spring member 138 can be configured to be flat in the relaxed stated or bowed in the relaxed state, as desired.

Figure 23:
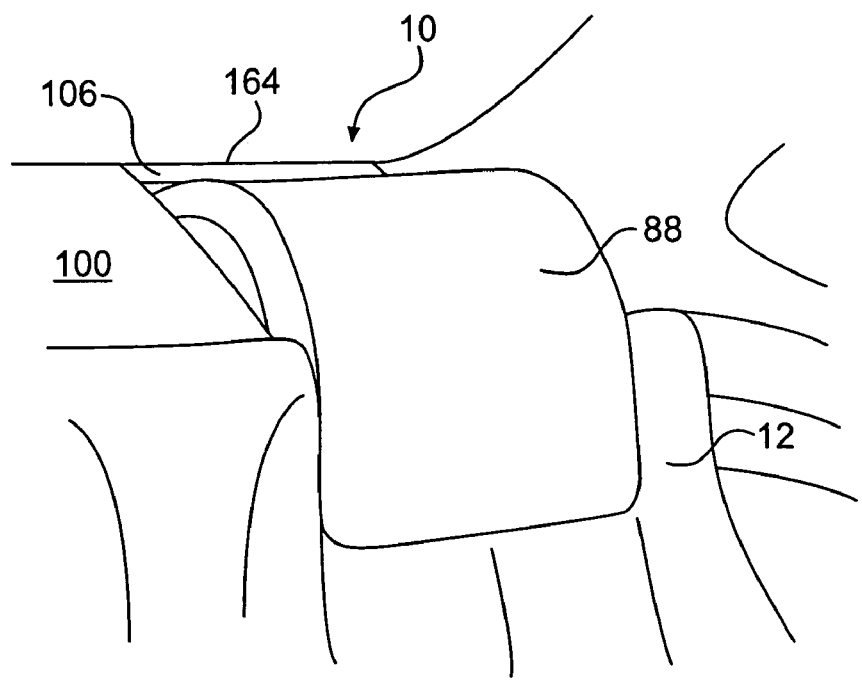
FIG. 23 is a front perspective view of an alternative embodiment of the present invention showing the retractable headrest in a retracted position.
Figure 24:
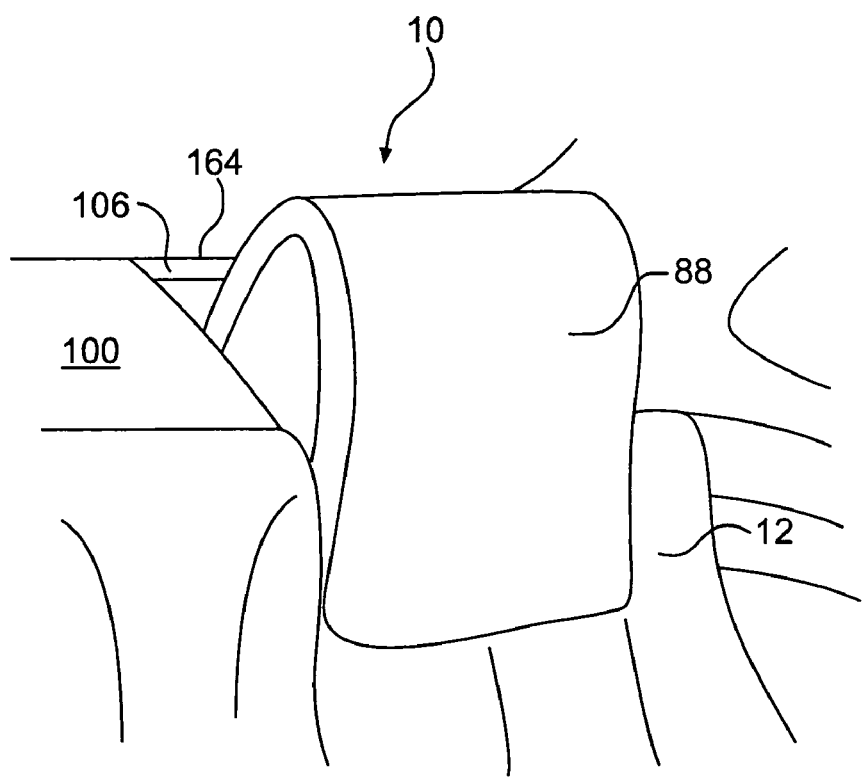
FIG. 24 is the view of FIG. 23 showing the headrest in an extended position.
Figure 25:
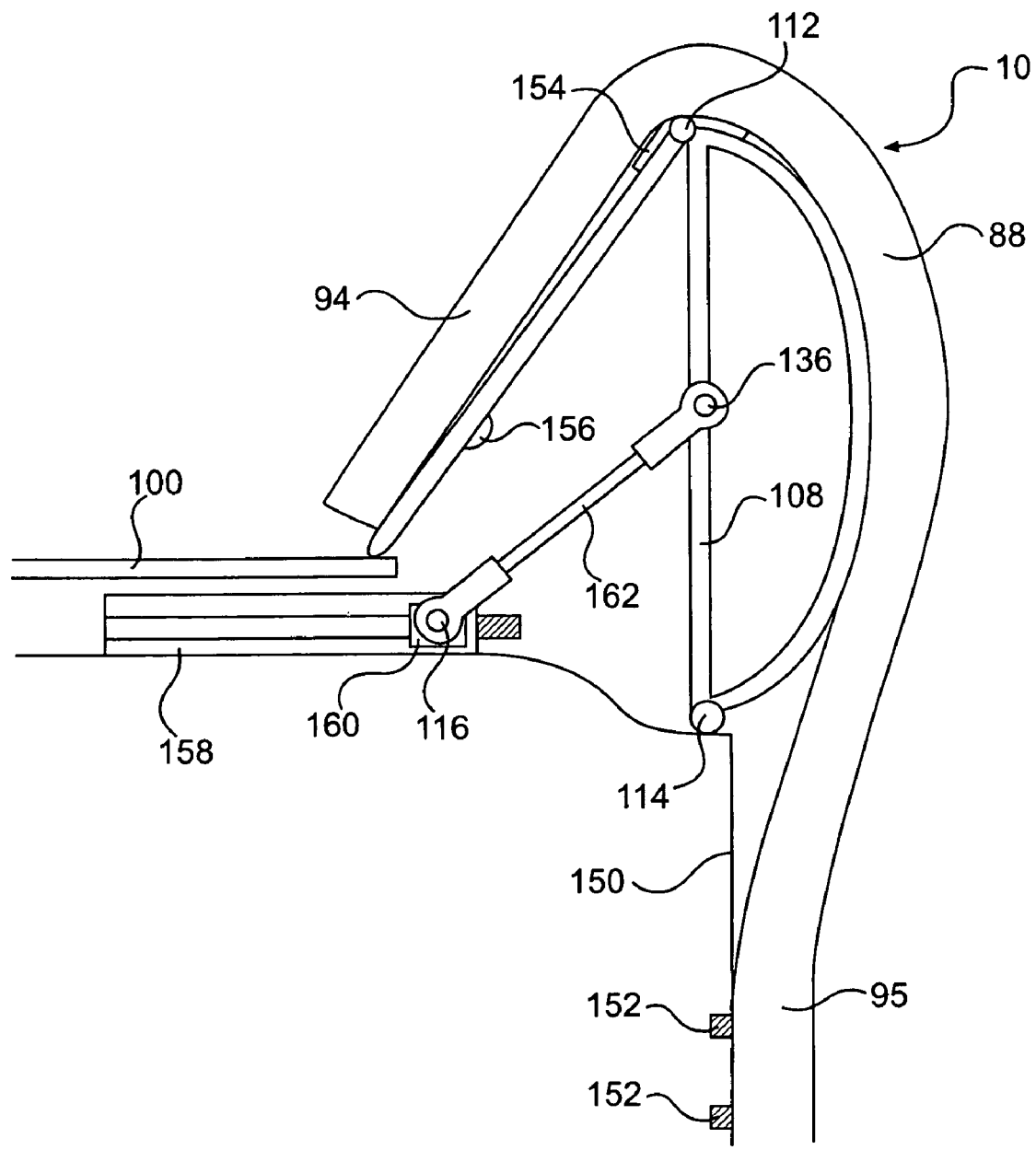
FIG. 25 is a side elevational view showing the operating mechanism of the embodiment shown in FIGS. 23 and 24.

An alternative embodiment is shown in FIGS. 23–25. This embodiment is a hybrid of the embodiments shown in FIGS. 6–16 and FIGS. 17–22. An extending cushion 88 is fastened to a seat supporting member 150 with one or more fasteners 152. A curved front support frame 108 pivots on a fixed pivot 114. A rear support frame 110 is pivotally attached to the front support frame 108 via hinge 112. The rear support frame 110 is biased toward the front support frame 108 by torsion spring 154 so that a lower portion of the rear support frame 110 is maintained in contact with a floor of the parcel shelf 100 to conceal the operating mechanism from view. A distal portion 94 of the extending cushion 88 is attached to the rear support frame 110 by one or more fasteners 156. A screw drive mechanism 158, for example, similar to the type of screw drive mechanism known for use in automotive seats to alter a height of a lumbar support, is fastened to the vehicle such that a movable carriage 160 of the screw drive mechanism can be driven in a forward and backward motion (to the right and left as shown in FIG. 25) as desired. A tie rod 162 is pivotally connected to the carriage 160 by movable pivot 116 and to the front support frame 108 by front support frame pivot 136 to convert linear motion of the carriage 160 to pivoting motion of the front support frame 108.

With this operating mechanism, as the carriage 160 is driven forward by the screw drive 158, it pivots the front support frame 108 forward and upward, thereby raising the extending cushion 88 into the extended protective position. See FIG. 24. Reversing the process and driving the carriage 160 rearward pivots the front support frame 108 rearward and downward, thereby lowering the extending cushion 88 into the retracted position which improves rear visibility through the rear windshield 164. See FIG. 23. Since the distal portion 94 of the extending cushion 88 is attached to the rear support frame 110, which follows the front support frame through operation of the torsion spring 154 or other spring member, the distal portion 94 will follow the rear support frame 110 and assist in providing an aesthetic appearance to the headrest 10 and concealing the operating mechanism. This mechanism provides a small minimum height which can readily be positioned in or retrofitted to the space available in the parcel shelf and upper seat region of a vehicle.

Preferably, the operation of the headrest 10 is determined automatically by the sensors 24. As with this embodiment, other hybrid embodiments can be created by combining various features of the various embodiments.

It is intended that various gussets, flaps and covers can be used with the various embodiments to conceal structure and openings created when the headrest of the present invention is extended and/or retracted to improve the appearance of the headrest. The pads extending cushions and pads can be constructed of a flexible foam covered in a desired upholstery material, such as woven cloth, leather or synthetic leather type material. Various inserts can be added to the flaps and extending cushions such as inserts for increasing the rigidity of the components or fastener type inserts for easing attachment of the pads and extending cushions to other components.

The present invention provides a retractable headrest that can be retracted when not in use so as not to impair the driver's vision and that has an aesthetic appearance integrated into the surrounding panels and upholstery when in both the extended position and the retracted position. In the retracted position the headrest has an appearance integrated into the seat, parcel shelf, surrounding panels and/or upholstery so as not to appear as a headrest. The retractable headrest is maintained in the retracted position until it is sensed that a passenger has occupied the seat corresponding to that headrest, whereupon the headrest is automatically extended to protect the passenger. The retractable headrest automatically retracts when it is sensed that a passenger has exited from the seat corresponding to that headrest. The headrest is simple in construction and the operating mechanism can be fitted into the seat or in the limited area between the trunk and the parcel shelf. The entire headrest can be constructed as a unit package in kit form that can be readily retrofitted into existing vehicles to achieve the advantages enumerated herein.

While certain examples of the various embodiments are shown, it is intended that these examples and embodiments can be altered without departing from the scope of the invention. Further, it is intended that the shapes, dimensions and geometric relationships of the various components in the embodiments shown can be altered as desired to conform to a particular application. While the various headrests are shown as being used in rear seat applications, the various embodiments can also be used with respect to front seats (particularly in two seat vehicles) and central seats in vehicles that have three or more rows of seats. The invention can be used in vehicles other than automobiles. It is also intended that any of the various aspects of the various embodiments described herein can be combined in different manners as desired to create new embodiments.

What is claimed is:

1. A retractable headrest for a vehicle seat comprising:
    an assembly comprising a flexible extending cushion having a proximal portion adapted to be attached to the seat, a support member adapted to be pivotally mounted to the seat, and a free distal portion comprised of an end portion of the flexible cushion and a rear portion of the support member, said assembly being movable between a retracted position and an extended position; and
    an operating mechanism for moving the support member between the retracted and extended positions, said operating mechanism being covered by the free distal portion;
    wherein the end portion and the rear portion will be progressively transitioned forward and backward as the support member is moved between its extended and retracted positions, respectively, with the free distal portion sliding between a range of moved positions following the movement of the support member, during which range of movement said free distal portion continues to cover the operating mechanism, thereby providing a passenger headrest when the flexible extending cushion and the support member are in the extended position.

2. A retractable headrest as in claim 1 wherein the head rest is automatically extended and retracted.

3. A retractable headrest as in claim 1, further comprising a curved front face for the support member, and wherein the free distal portion is supported by the rear portion.

4. A retractable headrest as in claim 3, wherein the rear portion is pivotally connected to an upper portion of the support member; and further including a spring member located at the pivot connection between the support member and the rear portion that biases the rear portion toward the support member.

5. A retractable headrest as in claim 4, wherein the free distal portion and a portion of the rear portion are constructed and arranged to nest in a complementary shaped, upwardly opening channel.

6. A retractable headrest as in claim 1, wherein the operating mechanism includes an extending arm pivotally connected at an upper end to the support member and which is pivotally mounted at a lower end thereof to a drive mechanism such that movement of the support member is accomplished by pivoting the support member.

7. A retractable headrest as in claim 6, and wherein the operating mechanism includes a linearly moving drive mechanism for raising and lowering the support member.

8. A retractable headrest as in claim 6, wherein the drive mechanism comprises:
    a screw drive mechanism;
    a carriage attached to the screw drive mechanism constructed and arranged to be selectively driven in a forward and rearward motion; and
    said extending arm thereby converting motion of the carriage to pivoting motion of the support member when the carriage is moved.

9. A retractable headrest as in claim 8 wherein the screw drive mechanism is motor driven.

10. A retractable headrest for vehicle seat, comprising:
    a seat;
    a headrest frame assembly including a forward portion pivotally mounted about a fixed pivot and a rear portion pivotally attached at one end to the forward portion, and a cushioned portion overlying the head rest frame assembly, the headrest frame assembly being progressively pivotally movable about said fixed pivot between a refracted position and an extended position;
    a channel positioned on a shelf located behind the seat, the channel being shaped to be complementary to the headrest frame assembly to slidably receive at least a rear portion of the headrest frame assembly in a complementary manner as the headrest frame assembly moves between the retracted and extended positions; and
    an operating mechanism attached to the headiest frame assembly for extending and retracting the headrest frame assembly.

11. A retractable headrest for a vehicle as in claim 10, and further comprising a parcel shelf panel incorporating the shelf channel.

12. A headrest for a seat that is moveable between retracted and extended positions comprising, a seat, a front frame pivotally attached to the seat, a rear frame pivotally attached to the front frame, a flexible cushion covering and attached to the front and rear frames, respectively, an operating mechanism connected between the seat and at least the front frame operatively causing the front frame and the flexible cushion to be progressively transitioned forward and backward to thereby raise and lower the headrest, respectively, as the front frame moves between the extended and retracted positions, which in turn causes the rear frame to pass through a range of angular positions each of which allows the rear frame to cover the operating mechanism.

13. A movable headrest as in claim 12 wherein the head rest is automatically transitioned between the extended and retracted positions.

14. A retractable headrest for a vehicle seat, comprising:
a seat;
a headrest frame assembly including a forward portion pivotally mounted about a fixed pivot and a rear portion having a front end and a rear end with the front end being pivotally attached to the forward portion, and a cushioned portion overlying the head rest frame assembly, the headrest frame assembly being progressively pivotally movable about said fixed pivot between a retracted position and an extended position;

a parcel shelf panel incorporating a shelf channel located behind the seat, the shelf channel being shaped to be complementary to the headrest frame assembly to slidably receive at least a portion of the rear end of the rear portion in a complementary manner as the headrest frame assembly moves between the retracted and extended positions; and an operating mechanism attached to the headrest frame assembly for extending and retracting the headrest frame assembly.

\* \* \* \* \*